United States Patent [19]

Simms

[11] 4,346,201
[45] Aug. 24, 1982

[54] POLYMER BLEND OF AN ACRYLIC POLYMER AND A BLOCK POLYMER OF ACRYLIC SEGMENTS AND POLYMERCAPTAN SEGMENT

[75] Inventor: John A. Simms, Wilmington, Del.

[73] Assignee: E. I. Du Pont de Nemours and Company, Wilmington, Del.

[21] Appl. No.: 229,160

[22] Filed: Jan. 28, 1981

Related U.S. Application Data

[63] Continuation-in-part of Ser. No. 16,001, Feb. 28, 1979, abandoned, which is a continuation-in-part of Ser. No. 823,324, Aug. 10, 1977, abandoned.

[51] Int. Cl.³ .................... C08L 75/06; C08L 75/08
[52] U.S. Cl. ................................... 525/440; 525/455
[58] Field of Search .................................. 525/440, 455

[56] References Cited

U.S. PATENT DOCUMENTS

| | | | |
|---|---|---|---|
| 3,028,367 | 4/1962 | O'Brien | 260/77.5 |
| 3,257,476 | 6/1966 | Tobolsky | 260/859 R |
| 3,278,352 | 10/1966 | Erickson | 149/19 |
| 3,291,859 | 12/1966 | Tobolsky | 260/859 R |
| 3,382,297 | 5/1968 | Thompson | 260/859 R |
| 3,390,206 | 6/1968 | Thompson | 260/875 |
| 3,446,780 | 5/1969 | Bertozzi | 260/75 |
| 3,804,920 | 4/1974 | Cunningham | 260/850 |
| 3,859,382 | 1/1975 | Hergenrother | 260/859 R |
| 3,865,898 | 2/1975 | Tobolsky | 260/859 R |
| 3,933,940 | 1/1976 | Anderson | 260/837 |
| 3,935,367 | 1/1976 | Merrill | 428/336 |
| 3,943,159 | 3/1976 | Quiring | 260/453 P |

FOREIGN PATENT DOCUMENTS 2256104 5/1974 Fed. Rep. of Germany.

*Primary Examiner*—Paul Lieberman
*Attorney, Agent, or Firm*—Hilmar L. Fricke

[57] ABSTRACT

A polymer blend of
(1) up to 40% by weight of a polymer of repeating units of ⁅A⁆ of hard acrylic segment and
(2) at least 60% by weight of block polymer of the repeating units ⁅A⁆⁅B⁆⁅A⁆ wherein [A] is of a hard acrylic segment having a glass transition temperature of 25° C. and above; and [B] is a segment of the formula

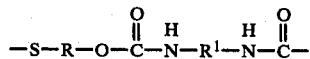

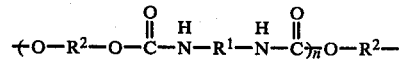

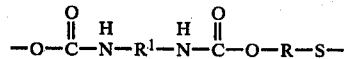

where
R is an alkylene group having 2–6 carbon atoms;
R¹ is aliphatic, cycloaliphatic or aromatic group;
R² is a polyester or a polyalkylene ether segment and n is from 0–10.

The polymer is useful in coating compositions, in particular, coating compositions for flexible hydrocarbon rubber and polyvinyl chloride substrates used in automobiles and trucks.

20 Claims, No Drawings

POLYMER BLEND OF AN ACRYLIC POLYMER AND A BLOCK POLYMER OF ACRYLIC SEGMENTS AND POLYMERCAPTAN SEGMENT

CROSS REFERENCE TO RELATED APPLICATIONS

This application is a continuation-in-part of my copending application Ser. No. 016,001, filed Feb. 28, 1979 abandoned which is a continuation-in-part of application Ser. No. 823,324 filed Aug. 10, 1977, now abandoned.

BACKGROUND OF THE INVENTION

This invention is related to polymer blends of a polymer and a block polymer, a process for making these polymer blends and coating compositions containing these polymer blends.

In modern automobiles and trucks, flexible plastic or rubber substrates are used, for example, flexible filler panels are located between the bumper and the chassis, flexible materials are used as fender extensions around headlights and taillights and other flexible exterior trim parts are used. Finishes are applied to these flexible parts to provide the truck or automobile with a pleasing aesthetic appearance but these finishes must have excellent durability, weatherability and flexibility. Flexible finishes useful for automobiles and trucks are taught by Hick U.S. Pat. No. 3,841,895 issued Oct. 15, 1974. While these finishes are of a good quality, there is a need for finishes with increased durability and coating compositions that can be used to repair flexible finishes.

The polymer blends of this invention are used to make coating composition that form excellent flexible finishes and that are useful for repairing flexible finishes.

SUMMARY OF THE INVENTION

A composition of a polymer blend of
(1) up to 40% by weight, based on the weight of the polymer blend, of a polymer of repeating units of A of a hard acrylic segment, wherein the polymer has a number average molecular weight of about 2,000-5,000, contains about 1-5% by weight of hydroxyl groups and has a glass transition temperature of 25° C. and above; and
(2) at least 60% by weight, based on the weight of the polymer blend, of block polymer consisting essentially of the repeating units of ⁅A⁆⁅B⁆⁅A⁆ wherein
⁅A⁆ comprises 15-85% by weight based on the weight of the block polymer, of a hard acrylic segment containing at least one hydroxyl group and having a glass transition temperature of 25° C. and above; and
B comprises 85-15% by weight, based on the weight of the block polymer, of a segment that has the formula

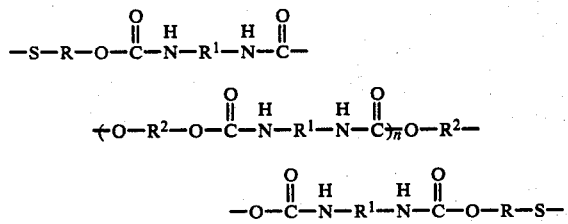

where
R is an alkylene group having 2-6 carbon atoms; $R^1$ is aliphatic, cycloaliphatic or an aromatic group;
$R^2$ is a polyester or a polyalkylene ether segment and n is from 0-10;
wherein the block polymer has a number average molecular weight of about 5,000-20,000 and a weight average molecular weight of about 20,000-100,000, contains about 0.1-5.0% by weight of hydroxyl groups and is free of isocyanate groups.

A process for preparing the polymer blend and coating compositions of the polymer blend also are part of this invention.

DESCRIPTION OF THE PREFERRED EMBODIMENTS

The polymer blend is useful in forming coating compositions in particular coating compositions that provide flexible finishes.

These coating compositions are useful for finishing flexible plastic or rubber substrates used in automobiles such as filler panels, side panels fender extensions, moldings and other trim parts. The flexible substrates can be hydrocarbon rubbers such as ethylenepropylene terpolymer elastomers, polyvinyl chloride, chlorinated rubbers, chloro-sulfonated rubber, acrylonitrile/butadiene/styrene polymers, urethane foamed elastomers, thermoplastic urethanes and the like.

The polymer blend preferably contains about 5-25% by weight of polymer and 75-95% by weight of block polymer.

The block polymer is prepared by first forming a polyester or a polyalkylene ether glycol and then the polyester of polyalkylene ether glycol is reacted with an organic diisocyanate to form an isocyanate terminated intermediate. This intermediate is reacted with a sufficient amount of a mercapto alkanol to form an isocyanate free —SH terminated intermediate. This —SH terminated intermediate then is reacted with acrylic monomers to form the polymer blend of block polymers having the aforementioned repeating unit of ⁅A⁆⁅B⁆⁅A⁆ and acrylic polymer having the ⁅A⁆ repeating unit.

The polyester is prepared by a conventional process in which a dicarboxylic acid or an anhydride thereof is reacted with a polyhydric alcohol at about 130° to 210° C. for about 5 to 30 hours in the presence of an esterification catalyst. Generally a solvent or diluent is used in the process. Typical polyhydric alcohols that can be used are glycerin, pentaerythritol, trimethylolethane, trimethylolpropane, glycols such as ethylene glycol, propylene glycol, butanediol, pentanediol, neopentyl glycol and the like. Typical dicarboxylic acids or the anhydrides thereof that can be used are phthalic acid, phthalic anhydride, isophthalic acid, terephthalic acid, adipic acid, sebacic acid, succinic acid, maleic acid, maleic anhydride, fumaric acid, azelaic acid, dodecanedioic acid and the like.

Polyesters can also be prepared from hydroxy acids or their lactones such as 6-hydroxy hexanoic acid and caprolactone used with glycol initiators or glycols and other dibasic acids such as those acids and glycols described above.

Typical esterification catalysts that can be used to prepare the polyesters are benzyl trimethyl ammonium hydroxide, tetramethyl ammonium chloride, organic tin compounds, such as dibutyl tin dilaurate, dibutyl tin oxide, and the like, titanium complexes and litharge.

About 0.1–4% by weight, based on the total weight of the polyester, of the catalyst is used.

Typical solvents and diluents which can be used are, for example, toluene, xylene, butyl acetate, acetone, methylisobutyl ketone, methylethyl ketone, isopropanol, butanol, hexane, acetone, ethylene glycol monoethyl ether acetate, VM and P naptha, mineral spirits and other aliphatic, cycloaliphatic, aromatic hydrocarbons, esters, ethers and ketones.

It may be desirable to incorporate a small portion of monocarboxylic aromatic acid into the polyester. Typical acids that can be used are benzoic acid, para tertiary butyl benzoic acid, phenol acetic acid, triethyl benzoic acid and the like.

Also, it may be desirable to incorporate a drying oil fatty acid into the polyester to impart air drying characteristics. Typical drying oil fatty acids that can be used are linseed oil fatty acids, tung oil fatty acids, soya oil fatty acids, dehydrated castor oil fatty acids and the like.

Typical polyalkylene ether glycols that can be used are poly(tetramethylene ether) glycol poly(propylene ether)glycol, poly(ethylene ether)glycol and the like.

The polyester or polyalkylene ether glycol is then reacted with a sufficient amount of organic diisocyanate at about 40° to 125° C. for about 0.5 to 6 hours to form an isocyanate terminated intermediate.

Typical organic diisocyanates that can be used are as follows: isophorone diisocyanate which is 3-isocyanate-methyl-3,5,5-trimethyl-cyclohexyl-isocyanate,
propylene-1,2-diisocyanate,
butylene-1,2-diisocyanate,
butylene-1,3-diisocyanate,
hexamethylene diisocyanate,
methyl-2,6-diisocyanate caproate,
octamethylene diisocyanate,
2,4,4-trimethylhexamethylene diisocyanate,
nonamethylene diisocyanate,
2,2,4-trimethylhexamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as
methylpropylbenzene diisocyanate,
methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate,
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide;
bis-(para-isocyano-cyclohexyl)phenyl phosphine oxide;
bis-(para-isocyano-cyclohexyl)N-phenyl amine,
bis-(para-isocyano-cyclohexyl)N-methyl amine,
bis-(4-isocyano-phenyl)diethyl silane,
bis-(4-isocyano-phenyl)diphenyl silane,
dichloro-biphenylene diisocyanate,
bis-(4-isocyano-phenyl)ethyl phosphine oxide,
bis-(4-isocyano-phenyl)phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-($\beta$-isocyano-t-butyl)toluene,
bis-(para-$\beta$-isocyano-t-butyl-phenyl)ether,
para-bis-(2-methyl-4-isocyano-phenyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2O(CH_2)_3NCO$,
$OCN(CH_2)_3S(CH_2)_3NCO$ and

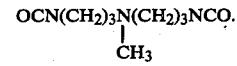

$$OCN(CH_2)_3\underset{\underset{CH_3}{|}}{N}(CH_2)_3NCO.$$

Isophorone diisocyanate is preferred since it reacts rapidly and forms a stable intermediate.

The isocyanate terminated intermediate is then reacted with mercapto alkanol at about 25° to 125° C. for about 0.5 to 6 hours to form an —SH terminated isocyanate free intermediate.

Typical mercapto alkanols that can be used have the formula H—S—R—OH where R is an alkylene group that has 2–6 carbon atoms and are as follows: 1,2-mercaptoethanol, 1,2 and 1,3 mercaptopropanol, mercaptoisopropanol, 1,4-mercaptobutanol, mercaptoisobutanol, mercaptopentanol, 1,6-mercaptohexanol and the like.

The isocyanate free —SH terminated intermediate is then polymerized with acrylic monomers using conventional polymerization techniques in which monomers, solvents such as those mentioned above, intermediate and polymerization catalyst are charged into a polymerization vessel and heated to about 50°–200° C. for about 1–6 hours to form a block copolymer. A sufficient amount of a hydroxy containing acrylic monomer is used to provide the polymer having repeating units of acrylic hard segment and the A segment of the block polymer with hydroxyl groups.

The resulting polymer blend formed in the above polymerization process contains polymer of repeating hard acrylic segments, repeating units of ⁺A⁺ as above described and an ⁺A⁺B⁺A⁺ block polymer.

The polymer of repeating units of A has a number average molecular weight of about 2,000–6,000 determined by gel permeation chromatography (G.P.C.) contains about 1–5% by weight of hydroxyl groups and has a glass transition temperature of 25° C. and above.

The resulting block polymer has a number average molecular weight of about 5,000–20,000 and a weight average molecular weight of about 20,000 to 100,000 determined by gel permeation chromatography using polystyrene as a standard. Preferably, the polymer contains about 0.1–5% by weight, based on the weight of the polymer, of hydroxyl groups.

About 0.1–4 percent by weight, based on the weight of the above constituents used to prepared the block polymer, of a polymerization catalyst is used. Typical catalysts are azo-bis-isobutyronitrile, azo-bis (α-gamma-dimethyl-valeronitrile), benzoyl peroxide, t-butyl peroxy pivalate, di-tertbutyl peroxide and the like.

Typical acrylic monomers used to prepare the polymers are alkyl acrylates and methacrylates such as methyl methacrylate, ethyl methacrylate, propyl methacrylate, isopropyl methacrylate, butyl methacrylate, isobutyl methacrylate, tertiary butyl methacrylate, hexyl methacrylate, 2-ethylhexyl methacrylate, and the like, methyl acrylate, ethyl acrylate, propyl acrylate, butyl acrylate, hexyl acrylate, octyl acrylate and the like. Typical acrylic monomers that provide a hydroxy group are hydroxy alkyl acrylate and methacrylates having 2–6 carbon atoms in the alkyl group such as hydroxyethyl acrylate, hydroxypropyl acrylate, hydroxybutyl acrylate, hydroxyhexyl acrylate, hydroxyethyl methacrylate, hydroxypropyl methacrylate, hydroxybutyl methacrylate hydroxyhexyl acrylate and the like. Other monomers can be used with the acrylic monomers such as acrylonitrile, methacrylonitrile, styrene, vinyl toluene, chlorostyrene and the like.

Glycidyl acrylate and glycidyl methacrylate can also be used to provide the polymer with glycidyl groups. Acrylic acid or methacrylic acid can be used to provide a polymer with carboxyl groups that, for example, can be dispersed in water.

Useful block polymers comprise 15 to 85% by weight of hard acrylic segment, A, and 85 to 15% by weight of polyester or polyalkylene ether segment, B.

Typical useful block polymers are as follows:

| ⁺A⁺ segment | ⁺B⁺ segment |
|---|---|
| Methyl methacrylate/hydroxy ethyl acrylate | Neopentyl glycol adipate/hexamethylene diisocyanate |
| Methyl methacrylate/butyl methacrylate/hydroxy ethyl acrylate | Neopentyl glycol azelate dodecane dioate/trimethyl hexamethylene diisocyanate |
| Methyl methacrylate/hydroxy ethyl acrylate/acrylic acid | 1,6 hexandiol adipate/hexa methylene diisocyanate |
| Methyl methacrylate/hydroxy ethyl acrylate/acrylic acid | neopentyl glycol adipate/hexamethylene diisocyanate |
| Methyl methacrylate/butyl methacrylate hydroxy ethyl acrylate/acrylic acid | poly(tetramethylene ether)glycol/hexa-methylene diisocyanate |
| Methyl methacrylate/butyl acrylate/ acrylonitrile/hydroxy ethyl acrylate/ acrylic acid | poly(tetramethylene ether)glycol/methylene bis(4-phenyl isocyanate) |
| Styrene/hydroxy ethyl acrylate/acrylic acid | poly(tetramethylene ether) glycol/hexamethylene diisocyanate |
| Methyl methacrylate/butyl methacrylate/hydroxy ethyl acrylate acrylic acid | 1,6 hexane diol-neopentyl glycol adipate/methylene-bis-(cyclohexyl isocyanate) |

Coating compositions prepared with the polymer blend contain as the film forming constituents about 50–95% by weight of the polymer blend and about 5–50% by weight of a cross-linking agent. Generally these coating compositions have a solids content of film forming constituent of about 5–70% by weight.

The cross-linking agent used in the coating composition is compatible with the polymer blend and can either be an alkylated melamine formaldehyde resin or a polyisocyanate. Typical alkylated melamine formaldehyde resins have one to eight carbon atoms in the alkyl group and are resins that are well known in the art. These resins are prepared by conventional techniques in which a lower alkyl alcohol such as methanol, ethanol, butanol, isobutanol, propanol, isopropanol, hexanol, 2-ethyl hexanol and the like is reacted with a melamine formaldehyde to provide pendent alkoxy groups.

Preferred melamine resins that are used are butylated melamine formaldehyde resins, methylated/butylated melamine formaldehyde resins and hexa(methoxymethyl)melamine.

An acid catalyst can be used in the coating composition such as para-toluene sulfonic acid or butyl acid phosphate or the amine salts of these acid catalysts. An acid catalyst is needed if there is an absence of acid groups in the block polymer or if a low temperature cure is required, or if a highly etherified melamine resin is used such as hexa(methoxymethyl)melamine.

A variety of organic polyisocyanates can be used as the crossing agent in the coating composition and include aliphatic, cycloaliphatic, heterocyclic polyisocyanates. Typical polyisocyanates, are for example, 4,4'-methylene-bis(cyclohexyl isocyanate), tetramethylene diisocyanate, hexamethylene diisocyanate, ethylene diisocyanate, cyclohexylene-1,2-diisocyanate, and the like.

Polyisocyanates of a biuret, for example, the biuret of hexamethylene diisocyanate made according to Mayer et al. U.S. Pat. No. 3,245,941, issued Apr. 12, 1966 can also be used.

Organic plasticizers can also be used in the coating composition in amounts up to 1–10 percent by weight based on the weight of film-forming constituents. Monomeric and polymeric plasticizers can be used such as phthalate ester plasticizers, and in particular, alkyl and cycloalkyl ester phthalates in which the alkyl groups have 2–10 carbon atoms such as dioctyl phthalate, didecyl phthalate, butyl benzylphthalate, dicyclohexyl phthalate and mixtures thereof. Epoxidized soya bean oil, oil free and oil modified alkyds can also be used as plasticizers. Polyester resins such as alkylene glycol esters of adipic and benzoic acid, for example, ethylene glycol adipate benzoate, ethylene glycol adipate benzoate phthalate, can also be used in the coating composition of this invention.

The coating composition can be pigmented. Typical pigments which can be used are metallic oxides, preferably titanium dioxide, zinc oxide, iron oxide, and the like, metallic flakes, such as aluminum flake, metallic powders, metallic hydroxides, "Afflair" pigments, i.e., mica coated with titanium dioxide, sulfates, carbonates, carbon blacks, silica, talc, china clay, organic pigments and other pigments, and organic dyes and lakes. Generally the pigment is formed into a mill base with the polymer blend or another polymer and mixed into the coating composition.

Other compatible resins can be incorporated into the coating composition such as vinyl chloride copolymers, polyurethanes, cellulose acetate butyrate, and silicone resins. Also, ultraviolet light stabilizers and antioxidants can be incorporated into the coating composition.

The coating composition can be formed into a water based finish by using acid constituents in the polymer blend and by neutralizing the polymer blend with ammonia or an amine such as diethylethanol amine and then adding water to form a dispersion or solution. Any of the aformentioned additives, resins, plasticizers and pigments can be incorporated into the aqueous composition by using conventional techniques.

A primer composition is usually applied to the substrate before the above coating composition is applied, in particular when the coating composition is used over a flexible substrate.

The flexible substrate may be any of one of the well-known saturated or unsaturated hydrocarbon elastomers, e.g., ethylene-propylene copolymer elastomers, particularly one that is made sulfur curable by the inclusion of 1–10 percent by weight nonconjugated diene, because of their better resistance to oxidative and thermal aging. Butyl rubber, styrene-butadiene rubber, polybutadiene rubber or polyisoprene rubber (either natural or synthetic) are also used. Typical ethylene-propylene rubbers are those copolymers containing 50–75 weight percent ethylene, 25–45 weight percent propylene, and 2–8 weight percent non-conjugated diene such as 1,4-hexadiene, 5-ethylidene-2-norbornene or dicyclopentadiene.

To prepare a coated article with the coating composition, a primer, if used, is applied by conventional techniques to the substrate by the usual application methods such as spraying, electrostatic spraying, dipping, brushing, flow-coating and the like. The primer is then baked at 95° to 145° C. for 5 to 60 minutes. The coating composition is then applied by one of the aforementioned application methods and baked at 95° to 130° C. for 15 to 60 minutes.

The following Examples illustrate the invention. All quantities are on a weight basis unless otherwise indicated.

EXAMPLE 1

Polyester Preparation

The following constituents are charged into a reaction vessel equipped with a stirrer, reflux condenser, thermometer and a heating mantle:

|  | grams |
| --- | --- |
| Azelaic acid | 752 |
| Dodecanedioic acid | 920 |
| Neopentyl glycol | 1032 |
| Toluene | 150 |
| Total | 2854 |

The resulting composition is heated to its reflux temperature and after 7.5 hours about 0.15 cc of stannous octoate are added and then after about 11 hours about 0.20 cc of stannous octoate are added. Over about 29 hours the temperature of the composition is increased to about 191° C. and then held at this temperature for about 12 hours. During this time, about 288 grams of water are removed.

The resulting composition has a solids content of 96.2% of a neopentyl azelate dodecanoate polyester having an acid number of 0.47 and a hydroxyl number of 87.3.

BLOCK POLYMER PREPARATION

An —SH terminated intermediate is prepared by charging the following constituents into a five-liter polymerization vessel equipped with a stainless steel stirrer, thermometer, fitted with a nitrogen inlet, dropping funnel and reflex condenser:

| Portion 1 | |
| --- | --- |
| Neopentyl glycol/ azelate/dodecanoate solution (prepared above) | 520 g |
| Toluene | 300 g |
| Portion 2 | |
| Mixture of 2,2,4 and 2,4,4 tri-methylhexamethylene diisocyanate | 109.7 g |
| Portion 3 | |
| Stannous octoate | 0.15 cc |
| Toluene | 10.0 g |
| Portion 4 | |
| 2 Mercaptoethanol | 20.3 g |

Portion 1 is charged into the vessel and stirred for five minutes. Portion 2 is added and stirred for 5 minutes and the resulting mixture is heated to 60° C. Portion 3 is added over about 5 minutes and the composition is heated to about 115° C. and held at this temperature for 15 minutes. Portion 4 is added and the composition is held at 115° C. for about 30 minutes. The resulting composition is free of isocyanate groups.

A monomer mix is prepared by blending together the following:

|  |  |
|---|---|
| Methyl methacrylate | 622g |
| Butyl methacrylate | 259g |
| Hydroxyethyl acrylate | 155g |
| Total | 1036g |

The polymer blend is prepared by adding the following constituents to the above prepared —SH terminated intermediate solution.

|  |  |
|---|---|
| Portion 1 | |
| Monomer Mix (prepared above) | 400g |
| Ethyl acetate | 200g |
| Portion 2 | |
| Monomer Mix (prepared above) | 636g |
| Azobisisobutylonitrile | 6g |
| Portion 3 | |
| Ethylene glycol monoethyl ether acetate | 300g |
| Portion 4 | |
| Ethyl acetate | 525g |

Portion 1 is added and the resulting mixture is brought to its reflux temperature. Portion 2 is added over a three-hour period while keeping the mixture at its reflux temperature and then held at its reflux temperature for an additional 30 minutes. Portion 3 is added and then Portion 4 is added. The resulting polymer blend is a solution that has a 54.4% by weight solids content, a Gardner Holdt viscosity measured at 25° C. of W and contains about 22% polymer and 78% block polymer.

The polymer of the blend contains 60% methyl methacrylate, 25% butyl methacrylate and 15% hydroxy ethyl acrylate and has an estimated glass transition temperature of about 66° C., contains 2.2% hydroxyl groups and has a weight average molecular weight of about 7,000 determined by gel permeation chromatography.

The block polymer has an inherent viscosity of 0.226 measured at 0.5% solids in 1,2-dichloroethane at 30° C. and has a number average molecular weight of 11,700 and a weight average molecular weight of 32,400. The above molecular weights are determined by gel permeation chromatography using polystyrene as a standard. The block polymer contains 30% neopentyl glycol azelate dodecanoate, 6.58% trimethyl hexamethylene diisocyanate, 1.21% 2-mercaptoethanol 37.33% methyl methacrylate, 15.54% butyl methacrylate and 9.34% hydroxyethyl acrylate.

A coating composition of 37 parts by weight of the above-prepared polymer blend solution are blended with 3.3 parts by weight of "Desmodur" N (biuret of hexamethylene diisocyanate), and a film of this coating composition is drawn down on a glass plate and baked for 30 minutes at 107° C. and then cured at room temperature for one week. The film is then tested for tensile strength, % elongation at break and initial modulus at 25° C., −18° C. and −29° C. with the following results:

| Test Temperature | Tensile Strength Pounds per square inch (psi) | % Elongation at Break | Initial Modulus (psi) |
|---|---|---|---|
| 25° C. | 2300 | 62 | 41,000 |
| −18° C. | 5300 | 36 | 117,000 |
| −29° C. | 6400 | 20 | 152,000 |

A white mill base is prepared as follows:

|  |  |
|---|---|
| Titanium Dioxide Pigment | 1800g |
| Polymer Blend Solution (Prepared above) | 818g |
| Solvent mixture (25% toluene, 25% ethylene glycol monoethyl ether acetate and 50% cellulose acetate) | 800g |
| Total | 3418g |

The above constituents are blended together and ground for one pass through a standard sandmill operated at a rate of one gallon per hour. The resulting mill base has a calculated pigment to binder ratio of 404/100.

A white paint is prepared as follows:

|  |  |
|---|---|
| Polymer Blend solution (prepared above) | 2714g |
| Ethyl Acetate | 1262g |
| "Tinuvin" 328 U.V. Screeners 2-(3,'5'-dialkyl 2'hydroxyphenyl) benzotriazole | 60g |
| White Mill Base (prepared above) | 1724g |
| Total | 5760g |

The resulting paint has a pigment to binder ratio of 49/100, a solids content of about 45% and a #1 Zahn cup viscosity of 91 sec. measured at about 25° C.

A cross linkable paint is prepared by mixing together the following constituents:

|  |  |
|---|---|
| White paint (prepared above) | 100.00g |
| Solvent Mixture (2 parts by volume ethyl acetate/1 part by volume ethylene glycol monobutyl ether acetate) | 74.40g |
| Isocyanate solution (33% by weight of the biuret of hexamethylene diisocyanate in a solvent of xylene/ethylene glycol monoethyl ether acetate/ ethyl acetate in a 10/10/80 ratio) | 15.23g |
| Retarder solution (0.27% of dibutyl tin dilaurate in acetyl acetone) | 7.70g |
| Total | 197.33g |

This cross linkable paint has the following characteristics:

| Time After Mixing | Brookfield Viscosity (measured using #2 spindle at 100 rpm at 25° C.) |
|---|---|
| Initial | 30.8 centipoises |
| 1 day | 33.6 |
| 2 days | 34.4 |
| 3 days | 36.8 |
| 4 days | 39.2 |

The crosslinkable paint after mixing is sprayed onto three primed steel panels. One panel is dried at room temperature. The other panels are baked for 30 minutes at 82° C. and 108° C. respectively. The gloss and knoop hardness of each of the resulting paint films is measured. The results are as follows:

| Bake | Film thickness | Knoop Hardness Time After Bake | | | |
|---|---|---|---|---|---|
| | | 2 Hrs. | 24 Hrs. | 48 Hrs. | 480 Hrs. |
| None | 2 mils | — | 2.6 | 3.6 | 4.2 |
| 30 minutes at 82° C. | 2 mils | 2.9 | 4.0 | 4.4 | 4.8 |
| 30 minutes at 108° C. | 2 mils | 3.9 | 4.4 | 4.7 | 4.9 |

The gloss of the film baked for 30 minutes at 82° C. is 73-76% at 20° and 88% at 60°.

The paint films have excellent weatherability and durability.

A ⅛-inch thick polyester urethane flexible rubber substrate is coated with the above crosslinkable paint and the resulting finish on the rubber is cured for two weeks at about 22° C. and then baked at 107° C. for 30 minutes. The finish did not crack at −30° C. when the rubber with the finish exposed was bent double over a ½-inch diameter steel mandrel.

EXAMPLE 2

The following constituents are charged into a reaction vessel equipped as in Example 1:

| Portion 1 | |
|---|---|
| Polyester Solution (40% polyester of neopentyl glycol/1,6 hexane diol (40/60 molar ratio) adipate having an acid number of 0.2, a hydroxyl number of 99.8 and a number average molecular weight of 1124, determined by gel permeation chromatography, in an organic solvent.) | 300.0g |
| Toluene | 200.0g |
| Portion 2 | |
| Hexamethylene diisocyanate | 50.6g |
| Portion 3 | |
| Stannous octoate | 0.1cc |
| Portion 4 | |
| 2-Mercaptoethanol | 8.3g |
| Portion 5 | |
| Monomer mixture (60% methyl methacrylate, 25% butyl methacrylate and 15% 2-hydroxyethyl acrylate) | 150.0g |
| Ethyl acetate | 100.0g |
| Portion 6 | |
| Monomer mixture (described above) | 241.2g |
| Azobisisobutyronitrile | 2.25g |
| Portion 7 | |
| Ethylene glycol monoethyl ether acetate | 200.0g |
| Portion 8 | |
| Ethyl acetate | 214.0g |

Portion 1 is charged into the reaction vessel and heated to about 90° C. Portion 2 is added and Portion 3 then is added and the resulting reaction mixture is heated to its reflux temperature of about 115° C. for about 15 minutes. Portion 4 is added and the reaction mixture is held at its reflux temperature for about 30 minutes. A sample is removed from the reaction mixture and checked with an infrared spectophotometer to determine if isocyanate groups are present. If isocyanate groups are present, the reaction mixture is held at its reflux temperature for an additional 30 minutes. If no isocyanate groups are present, Portion 5 is added and the reaction mixture is brought to its reflux temperature. Portion 6 is added at a uniform rate over a three hour period while maintaining the reaction mixture at its reflux temperature and then held at this temperature for an additional 30 minutes. Portion 7 is added and then Portion 8 is added.

The resulting polymer blend solution has a polymer solids content of 55% by weight a Gardner Holdt viscosity measured at the above solids and at 25° C. of X, and contains about 20.5% polymer and 79.5% block polymer.

The polymer of the polymer blend contains about 60% methyl methacrylate, 25% butyl methacrylate and 15% 2-hydroxyethyl acrylate and has an estimated glass transition temperature of 66° C., contains 2.2% hydroxyl groups and has a weight average molecular weight of about 3900 determined by gel permeation chromatography.

The block polymer has an inherent viscosity of 0.352 measured at 30° C. on a 0.5% polymer solids solution using 1,2-dichlorethane as the solvent. The block polymer has a number average molecular weight of about 13,200 and a weight average molecular weight of about 38,000 measured as in Example 1. The block polymer contains 40% neopentyl glycol/1,6 hexane diol adipate, 6.74% hexamethylene diisocyanate, 1.11% 2-mercaptoethanol, 31.29% methyl methacrylate, 13.04% butyl methacrylate and 7.82% 2-hydroxyethyl acrylate.

A white mill base is prepared as in Example 1 except the above prepared polymer blend solution is used in place of the polymer blend solution of Example 1. A white paint is prepared as in Example 1 except the above white mill base is used. A crosslinkable paint is prepared as in Example 1 except the above white paint is used.

The resulting crosslinkable paint is sprayed onto primed steel panels and baked as in Example 1. The resulting finish has good hardness and gloss and is weatherable. The paint is sprayed onto the rubber substrate described in Example 1 and cured and baked as in Example 1 and forms a finish which has excellent flexibility.

EXAMPLE 3

The following constituents are charged into a reaction vessel equipped as in Example 1:

| Portion 1 | |
|---|---|
| Polyester (Neopentyl glycol/1,6 hexane diol (40/60 molar ratio) adipate having a hydroxyl number of 34.6 and a number average molecular weight of 3240 determined by gel permeation chromatography) | 320.0g |
| Toluene | 272.0g |
| Portion 2 | |
| 4,4'-methylene-bis-(cyclohexyl isocyanate) | 39.0g |
| Portion 3 | |
| Stannous octoate | 0.2cc |
| Portion 4 | |
| 2-mercaptoethanol | 7.7g |
| Portion 5 | |
| Monomer mixture (84% methyl methacrylate, 12% hydroxyethyl acrylate, 4% acrylic acid) | 218.0g |
| Acetone | 48.0g |
| Portion 6 | |
| Monomer mixture (described above) | 218.0g |
| Azobisisobutyronitrile | 1.7g |
| Portion 7 | |
| Dimethylethanolamine | 21.5g |

-continued

| Portion 8 | |
|---|---|
| Water | 1525.0g |

Portion 1 is charged into the reaction vessel and heated to about 90° C. Portion 2 is added. Portion 3 then is added and the resulting reaction mixture is heated to its reflux temperature for about 15 minutes. Portion 4 is added and the reaction mixture is held at its reflux temperature for about 30 minutes. A sample is removed from the reaction mixture and checked with an infrared spectrophotometer to determine if isocyanate groups are present. If isocyanate groups are present, the reaction mixture is held at its reflux temperature for an additional 30 minutes. If no isocyanate groups are present, Portion 5 is added and the reaction mixture is brought to its reflux temperature. Portion 6 is added at a uniform rate over a three-hour period while maintaining the reaction mixture at its reflux temperature and then held at this temperature for an additional 30 minutes. Portion 7 is added and then Portion 8 is added.

The resulting aqueous polymer blend dispersion has a polymer solids content of about 30% by weight and pH of about 7.0 and a Brookfield viscosity of 77 centipoises measured at 25° C. using a #1 spindle at 50 rpm and contains about 17.4% polymer and 82.6% block polymer.

The polymer of the polymer blend contains about 84% methylmethacrylate, 12% hydroxyethyl acrylate and 4% acrylic acid and has an estimated glass transition temperature of 88° C., contains 1.76% hydroxyl groups and has a weight average molecular weight of about 5100 determined by gel permeation chromatography.

The block polymer has an inherent viscosity of 0.307 measured at 30° C. on a 0.5% polymer solids solution using 1,2-dichloroethane as the solvent. The block polymer has a number average molecular weight of about 10,600 and a weight average molecular weight of about 29,000 measured as in Example 1. The polymer contains 40.02 neopentyl glycol/1,6 hexane diol adipate, 4.88% 4,4'-methylene-bis-(cyclohexyl isocyanate) diisocyanate, 0.96% 2,mercaptoethanol, 45.48% methyl methacrylate, 6.49% 2,hydroxyethyl acrylate and 2.17% acrylic acid.

A white paint is prepared by grinding the following constituents in a sand mill:

| | |
|---|---|
| Polymer blend dispersion (prepared above) | 425.0g |
| Methylated melamine resin solution (80% solids in isopropanol) | 21.8g |
| Diethylene glycol monobutyl ethers | 20.0g |
| Titanium dioxide pigment | 25.0g |

The resulting paint has a 31 second viscosity measured with a #2 Zahn cup at 25° C.

The above paint is sprayed onto a primed flexible ethylene propylene rubber substrate and cured and baked as in Example 1 to form a glossy finish that has good weatherability, durability and flexibility at low temperatures.

EXAMPLE 4

The following constituents are charged into a reaction vessel equipped as in Example 1:

| Portion 1 | |
|---|---|
| Poly (tetramethylene ether) glycol having a weight average molecular weight of about 1000 measured by gel permeation chromatography | 800.0g |
| Toluene | 800.0g |
| Portion 2 | |
| 4,4'-methylene-bis-(cyclohexyl isocyanate) | 264.0g |
| Portion 3 | |
| Stannous octoate | 0.4cc |
| Portion 4 | |
| 2-Mercaptoethanol | 31.2g |
| Portion 5 | |
| Monomer mixture (60% methyl methacrylate, 25% butyl methacrylate, 12% 2-hydroxy ethylene acrylate and 3% acrylic acid) | 496.0g |
| Portion 6 | |
| Monomer mixture (described above) | 360.0g |
| Toluene | 80.0g |
| Azobisisobutyronitrile | 4.0g |
| Portion 7 | |
| Isopropyl alcohol | 408.0g |

Portion 1 is charged into the reaction vessel and heated to about 90° C. Portion 2 is added and Portion 3 then is added and the resulting reaction mixture is heated to its reflux temperature of about 110° C. for about 15 minutes. Portion 4 is added and the reaction mixture is held at its reflux temperature for about 30 minutes. A sample is removed from the reaction mixture and checked with an infrared spectophotometer to determine if isocyanate groups are present. If isocyanate groups are present, the reaction mixture is held at its reflux temperature for an additional 30 minutes. Portion 5 is added and the reaction mixture is brought to its reflux temperature. Portion 6 is added at a uniform rate over a three-hour period while maintaining the reaction mixture at its reflux temperature and then held at this temperature for an additional 15 minutes. Portion 7 is added.

The resulting polymer blend solution has a polymer solids content of 62% by weight and a Gardner Holdt viscosity measured at the above solids and at 25° C. of about Z5 and contains about 11% polymer and 89% block polymer.

The polymer of the polymer blend contains about 60% by weight methyl methacrylate, 25% butyl acrylate, 12% 2-hydroxyl ethyl acrylate and 3% acrylic acid and has an estimated glass transition temperature of 72° C., contains 1.76% hydroxyl groups and has a weight average molecular weight of about 4400 determined by gel permeation chromatography.

The block polymer has an inherent viscosity of 0.369 measured at 30° C. on a 0.5% polymer solids solution using 1,2-dichloroethane as the solvent. The block polymer has a number average molecular weight of 11,000 and a weight average molecular weight of 32,000 measured as in Example 1. The block polymer contains 41.05% poly(tetramethylene ether) glycol, 13.53% 4,4'-methylene-bis-(cyclohexyl isocyanate) 1.59% 2-mercaptoethanol, 26.34% methyl methacrylate, 10.96% butyl methacrylate, 5.22% 2-hydroxyethyl acrlate and 1.31% acrylic acid.

A crosslinkable composition prepared by blending the above-prepared polymer blend solution with a butylated melamine formaldehyde resin solution such that the ratio of polymer to butylated melamine formaldehyde resin is 80:20. The resulting composition is sprayed onto a primed metal substrate and baked at 120° C. for 30 minutes to provide a hard glossy finish.

A white mill base is prepared as in Example 1 except the above-prepared polymer blend solution is used in place of the polymer blend solution of Example 1. A white paint is prepared as in Example 1 except the above white mill base is used.

A crosslinkable paint is prepared by blending the above white paint with a butylated melamine formaldehyde resin solution so that the ratio of polymer to butylated melamine resin is 80:20. The resulting paint is sprayed onto a flexible ethylene/propylene rubber substrate and baked as above to provide a primer that is flexible and hydrolytically stable. An acrylic enamel can be applied to the primed substrate and provides a high quality finish.

I claim:

1. A composition comprising a polymer blend
   (1) up to 40% by weight, based on the weight of the polymer blend, of a polymer of repeating units of {A} of a hard acrylic segment, wherein the polymer has a number average molecular weight of about 2,000–6,000, contains about 1–5% by weight of hydroxyl groups and has a glass transition temperature of 25° C. and above; and
   (2) at least 60% by weight, based on the weight of the polymer blend, of block consisting essentially of the repeating units of {A}{B}{A} wherein

[A] comprises 15–85% by weight, based on the weight of the block polymer, of a hard acrylic segment containing at least one hydroxyl group and having a glass transition temperature of 25° C. and above; and

[B] comprises 85–15% by weight, based on the weight of the block polymer, of a segment that has the formula

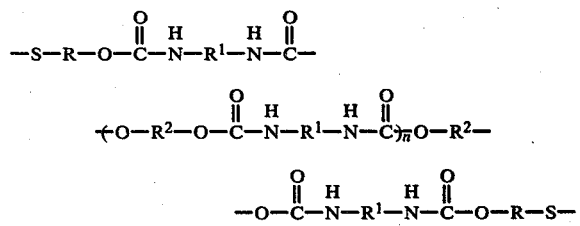

where
R is an alkylene group having 2–6 carbon atoms;
$R^1$ is an aliphatic, a cycloaliphatic or an aromatic group;
$R^2$ is a polyester segment or a polyalkylene ether segment; and
n is from 0–10;
wherein the block polymer has a number average molecular weight of about 5,000–20,000 and a weight average molecular weight of about 20,000–100,000, contains about 0.1–5.0% by weight of hydroxyl groups and is free of isocyanate groups;
wherein the polymer blend is prepared by a process which comprises the steps of
   (1) contacting an organic diisocyanate with a polyester or a poly(alkylene ether) glycol at about 40°–125° C. for about 0.5–6 hours to form an isocyanate terminated intermediate;
   (2) contacting the isocyanate terminated intermediate with a mercapto alkanol of the formula H—S—R—OH where R has 2–6 carbon atoms to form an —SH terminated intermediate that is free of isocyanate groups;
   (3) polymerizing the —SH terminated intermediate with acrylic monomers wherein at least one of the acrylic monomers contains a hydroxyl group in the presence of a free radical polymerization catalyst at about 50°–200° C. for about 1–6 hours to form the polymer blend.

2. The polymer blend of claim 1 in which {A} of the polymer and block polymer comprises and alkyl methacrylate and a hydroxy alkyl acrylate or a hydroxy alkyl methacrylate.

3. The polymer blend of claim 2 in which the polymer blend comprises about 5–25% by weight of polymer and about 75–95% by weight of block polymer.

4. The polymer blend of claim 3 in which R is $(CH_2)_2$ and $R^1$ is an aliphatic group and $R^2$ is a polyester or a poly(alkylene ether).

5. The polymer blend of claim 3 in which [A] consists essentially of an alkyl methacrylate, a hydroxy alkyl acrylate and acrylic acid, R is $(CH_2)_2$, $R^1$ is a cycloaliphatic group and $R^2$ is a polyester segment.

6. The polymer blend of claim 4 in which [A] segment consists essentially of methyl methacrylate and hydroxy ethyl acrylate, $R^1$ is $(CH_2)_6$ and $R^2$ consists essentially of neopentyl glycol adipate.

7. The polymer blend of claim 4 in which [A] segment consists essentially of methyl methacrylate, butyl methacrylate and hydroxy ethyl acrylate, $R^1$ is trimethylhexamethylene, and $R^2$ consists essentially of neopentyl glycol azelate dodecane dioate.

8. The polymer blend of claim 3 in which [A] segment consists essentially of methyl methacrylate, hydroxy ethyl acrylate and acrylic acid, R is $(CH_2)_2$, $R^1$ is $(CH_2)_6$ and $R^2$ consists essentially of a neopentyl glycol/1,6 hexane diol adipate polyester.

9. The polymer blend of claim 3 in which [A] segment consists essentially of methyl methacrylate, hydroxy ethyl acrylate and acrylic acid, R is $(CH_2)_2$, $R^1$ is $(CH_2)_6$ and $R^2$ is neopentyl glycol hexane diol adipate polyester 10. The polymer blend of claim 3 in which [A] segment consists essentially of methyl methacrylate, butyl methacrylate, hydroxy ethyl acrylate and acrylic acid, R is $(CH_2)_2$, $R^1$ is bis-(cyclohexyl methane) and $R^2$ is poly(tetramethylene ether)glycol.

11. The polymer blend of claim 3 in which [A] segment consists essentially of methyl methacrylate, butyl acrylate, acrylonitrile, hydroxy ethyl acrylate and acrylic acid, R is $(CH_2)_2$, $R^1$ is

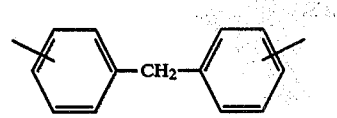

and $R^2$ is poly(tetramethylene ether) glycol.

12. The polymer blend of claim 3 in which A segment consists essentially of hydroxyethyl acrylate, acrylic acid and styrene, R is $(CH_2)_2$, $R^1$ is $(CH_2)_6$ and $R^2$ is poly(tetramethylene ether) glycol.

13. The polymer of claim 3 in which A segment consists essentially of methyl methacrylate, butyl methacrylate, hydroxy ethyl acrylate and acrylic acid, R is $(CH_2)_2$, $R^1$ is bis-(cyclohexyl methane) and $R^2$ is polyester of 1,6 hexane diol adipate and neopentyl glycol adipate.

14. A process for preparing the polymer blend of claim 1 which comprises the steps of
   (1) contacting an organic diisocyanate with a polyester or a poly(alkylene ether) glycol at about 40°–125° C. for about 0.5–6 hours to form an isocyanate terminated intermediate;
   (2) contacting the isocyanate terminated intermediate with a mercapto alkanol of the formula H—S—R—OH where R has 2–6 carbon atoms to form an —SH terminated intermediate that is free of isocyanate groups;
   (3) polymerizing the —SH terminated intermediate with acrylic monomers wherein at least one of the acrylic monomers contains a hydroxyl group in the presence of a free radical polymerization catalyst at about 50°–200° C. for about 1–6 hours to form the polymer blend of claim 1.

15. A coating composition comprising about 5–70% weight of the polymer blend of claim 1 and a solvent for the polymer.

16. An aqueous coating composition comprising 5–70% by weight of the polymer blend of claim 1 dispersed in an aqueous medium.

17. A coating composition comprising 5–70% by weight of film-forming constituents consisting essentially of
   50–95% by weight of the polymer blend of claim 1 and 5–50% by weight of a crosslinking agent.

18. The coating composition of claim 17 in which the crosslinking agent is an organic polyisocyanate.

19. The coating composition of claim 17 in which the crosslinking agent is an alkylated melamine formaldehyde resin.

20. A flexible substrate coated with a dried crosslinked layer of the coating composition of claim 17.